US012307292B2

(12) United States Patent
Chishty

(10) Patent No.: US 12,307,292 B2
(45) Date of Patent: May 20, 2025

(54) TECHNIQUES FOR PAIRING IN A TASK ASSIGNMENT SYSTEM WITH AN EXTERNAL PAIRING SYSTEM

(71) Applicant: Afiniti AI Limited, Dublin (IE)

(72) Inventor: Ain Chishty, Rockville, MD (US)

(73) Assignee: Afiniti AI Limited, Dublin (IE)

( * ) Notice: Subject to any disclaimer, the term of this patent is extended or adjusted under 35 U.S.C. 154(b) by 512 days.

(21) Appl. No.: 17/167,429

(22) Filed: Feb. 4, 2021

(65) Prior Publication Data

US 2021/0240531 A1 Aug. 5, 2021

Related U.S. Application Data

(60) Provisional application No. 62/970,529, filed on Feb. 5, 2020.

(51) Int. Cl.
*G06F 9/48* (2006.01)
*G06F 9/54* (2006.01)

(52) U.S. Cl.
CPC ............ *G06F 9/4887* (2013.01); *G06F 9/541* (2013.01)

(58) Field of Classification Search
CPC ............................... G06F 9/4887; G06F 9/541
See application file for complete search history.

(56) References Cited

U.S. PATENT DOCUMENTS 5,155,763 A 10/1992 Bigus et al.
5,206,903 A 4/1993 Kohler et al.
(Continued)

FOREIGN PATENT DOCUMENTS

AU 2008349500 C1 5/2014
AU 2009209317 B2 5/2014
(Continued)

OTHER PUBLICATIONS

Afiniti, "Afiniti® Enterprise Behavioral Pairing™ Improves Contact Center Performance," White Paper, retrieved online from URL: <http://www.afinitit,com/wp-content/uploads/2016/04/Afiniti_White-Paper_Web-Email.pdf> 2016, (11 pages).
(Continued)

*Primary Examiner* — April Y Blair
*Assistant Examiner* — Jonathan R Labud
(74) *Attorney, Agent, or Firm* — Wilmer Cutler Pickering Hale and Dorr LLP

(57) ABSTRACT

Techniques for pairing in a task assignment system with an external pairing system are disclosed. In one particular embodiment, the techniques may be realized as a method for pairing in a task assignment system with an external pairing system comprising transmitting first information that identifies one or more tasks waiting for assignment and one or more agents available for assignment; transmitting a pairing request; determining an initial timeout window to wait for the external pairing system to respond to the pairing request; receiving at a first time within the initial timeout window, an extension request that includes an instruction to extend the initial timeout window; extending the initial timeout window in response to the receiving the extension request; and receiving at a second time within the extended timeout window, a pairing response that includes a selected pairing between the one or more tasks and the one or more agents.

54 Claims, 5 Drawing Sheets

(56) References Cited

U.S. PATENT DOCUMENTS

| | | |
|---|---|---|
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,021,428 A | 2/2000 | Miloslavsky |
| 6,044,355 A | 3/2000 | Crockett et al. |
| 6,044,468 A | 3/2000 | Osmond |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,519,568 B1 | 2/2003 | Harvey et al. |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,744,878 B1 | 6/2004 | Komissarchik et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,895,083 B1 | 5/2005 | Bers et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,372,952 B1 | 5/2008 | Wu et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,306,212 B2 | 11/2012 | Arora |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,856,869 B1 | 10/2014 | Brinskelle |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,938,063 B1 | 1/2015 | Hackbarth et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,042,265 B1 | 5/2015 | Vendrow et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,712,676 B1 | 7/2017 | Chishti |
| 9,712,679 B2 | 7/2017 | Chishti et al. |
| 9,781,269 B2 | 10/2017 | Chishti et al. |
| 9,787,841 B2 | 10/2017 | Chishti et al. |
| 9,930,180 B1 | 3/2018 | Kan et al. |
| 9,942,405 B1 | 4/2018 | Kan et al. |
| RE46,986 E | 8/2018 | Chishti et al. |
| 10,116,800 B1 | 10/2018 | Kan et al. |
| 10,135,987 B1 | 11/2018 | Chishti et al. |
| RE47,201 E | 1/2019 | Chishti et al. |
| 10,284,727 B2 | 5/2019 | Kan et al. |
| 10,404,861 B2 | 9/2019 | Kan et al. |
| 10,956,855 B1* | 3/2021 | Coughran ............... G06N 20/20 |
| 2001/0032120 A1 | 10/2001 | Stuart et al. |
| 2001/0044896 A1 | 11/2001 | Schwartz et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |

(56) References Cited

U.S. PATENT DOCUMENTS

| | | |
|---|---|---|
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0059029 A1 | 3/2003 | Mengshoel et al. |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0211881 A1 | 9/2007 | Parker-Stephen |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0249083 A1 | 10/2009 | Forlenza et al. |
| 2009/0304172 A1 | 12/2009 | Becerra et al. |
| 2009/0305172 A1 | 12/2009 | Tanaka et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142689 A1 | 6/2010 | Hansen et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2011/0206199 A1 | 8/2011 | Arora |
| 2012/0051536 A1 | 3/2012 | Chishti et al. |
| 2012/0051537 A1 | 3/2012 | Chishti et al. |
| 2012/0183131 A1 | 7/2012 | Kohler et al. |
| 2012/0224680 A1 | 9/2012 | Spottiswoode et al. |
| 2012/0269053 A1* | 10/2012 | Yu .................. H04L 47/785 370/216 |
| 2012/0278136 A1 | 11/2012 | Flockhart et al. |
| 2013/0003959 A1 | 1/2013 | Nishikawa et al. |
| 2013/0051545 A1 | 2/2013 | Ross et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0270133 A1 | 9/2014 | Conway et al. |
| 2014/0341370 A1 | 11/2014 | Li et al. |
| 2015/0055772 A1 | 2/2015 | Klemm et al. |
| 2015/0281448 A1 | 10/2015 | Putra et al. |
| 2016/0080573 A1 | 3/2016 | Chishti |
| 2017/0013131 A1 | 1/2017 | Craib |
| 2017/0064080 A1 | 3/2017 | Chishti et al. |
| 2017/0064081 A1 | 3/2017 | Chishti et al. |
| 2017/0316438 A1 | 11/2017 | Konig et al. |
| 2018/0191904 A1* | 7/2018 | Chishti ............. H04M 3/523 |
| 2018/0316793 A1 | 11/2018 | Kan et al. |
| 2018/0316794 A1 | 11/2018 | Kan et al. |
| 2019/0149619 A1* | 5/2019 | Lisac ................ H04L 67/51 709/203 |
| 2019/0222697 A1 | 7/2019 | Kan et al. |

FOREIGN PATENT DOCUMENTS

| | | |
|---|---|---|
| AU | 2009311534 B2 | 8/2014 |
| AU | 2015203175 A1 | 7/2015 |
| AU | 2015243001 A1 | 11/2015 |
| CN | 101093590 A | 12/2007 |
| CN | 102164073 A | 8/2011 |
| CN | 102390184 A | 3/2012 |
| CN | 102555536 A | 7/2012 |
| CN | 202965525 U | 6/2013 |
| CN | 203311505 U | 11/2013 |
| CN | 102301688 B | 5/2014 |
| CN | 102017591 B | 11/2014 |
| CN | 108197912 A | 6/2018 |
| CN | 110177181 A | 8/2019 |
| CN | 110740217 A | 1/2020 |
| EP | 0493292 A2 | 7/1992 |
| EP | 0863651 A2 | 9/1998 |
| EP | 0949793 A1 | 10/1999 |
| EP | 1011974 A1 | 6/2000 |

(56) References Cited

FOREIGN PATENT DOCUMENTS

| | | |
|---|---|---|
| EP | 1032188 A1 | 8/2000 |
| EP | 1107557 A2 | 6/2001 |
| EP | 1335572 A2 | 8/2003 |
| EP | 2338270 B1 | 4/2018 |
| GB | 2339643 A | 2/2000 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-507420 A | 6/2000 |
| JP | 2000-236393 A | 8/2000 |
| JP | 2000-253154 A | 9/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2009-081627 A | 4/2009 |
| JP | 2011-511533 A | 4/2011 |
| JP | 2011-511536 A | 4/2011 |
| JP | 2012-075146 A | 4/2012 |
| JP | 5421928 B2 | 2/2014 |
| JP | 5631326 B2 | 11/2014 |
| JP | 5649575 B2 | 1/2015 |
| JP | 2015-514268 A | 5/2015 |
| JP | 2015-514371 A | 5/2015 |
| KR | 10-2002-0044077 A | 6/2002 |
| KR | 10-2013-0099554 A | 9/2013 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| PH | 1-2011-500868 | 6/2015 |
| WO | WO-1999/17517 A1 | 4/1999 |
| WO | WO-00/70849 A2 | 11/2000 |
| WO | WO-2001/063894 A2 | 8/2001 |
| WO | WO-2006/124113 A2 | 11/2006 |
| WO | WO-2009/097018 A1 | 8/2009 |
| WO | WO-2009/097210 A1 | 8/2009 |
| WO | WO-2010/053701 A2 | 5/2010 |
| WO | WO-2011/081514 A1 | 7/2011 |
| WO | WO-2013/148453 A1 | 10/2013 |
| WO | WO-2015/019806 A1 | 2/2015 |
| WO | WO-2016/048290 A1 | 3/2016 |

OTHER PUBLICATIONS

Anonymous, (2006) "Performance Based Routing in Profit Call Centers," The Decision Makers' Direct, located at www.decisioncraft.com, Issue Jun. 2002, (3 pages).
Chen, G., et al., "Enhanced Locality Sensitive Clustering in High Dimensional Space", Transactions on Electrical and Electronic Materials, vol. 15, No. 3, Jun. 25, 2014, pp. 125-129 (5 pages).
Cleveland, William S., "Robust Locally Weighted Regression and Smoothing Scatterplots," Journal of the American Statistical Association, vol. 74, No. 368, pp. 829-836 (Dec. 1979).
Cormen, T.H., et al., " Introduction to Algorithms", Third Edition, Chapter 26 and 29, 2009, (116 pages).
Gans, N. et al., "Telephone Call Centers: Tutorial, Review and Research Prospects," Manufacturing & Service Operations Management, vol. 5, No. 2, 2003, pp. 79-141, (84 pages).
International Preliminary Report on Patentability and Written Opinion issued in connection with PCT/US2009/066254 dated Jun. 14, 2011, (6 pages).
International Search Report and Written Opinion issued by the European Patent Office as International Searching Authority for PCT/IB2016/001762 dated Feb. 20, 2017, (15 pages).
International Search Report and Written Opinion issued by the European Patent Office as International Searching Authority for PCT/IB2016/001776 dated Mar. 3, 2017, (16 pages).
International Search Report and Written Opinion issued by the European Patent Office as International Searching Authority for PCT/IB2017/000570 dated Jun. 30, 2017, (13 pages).
International Search Report and Written Opinion issued by the European Patent Office as International Searching Authority for PCT/IB2018/000434 dated Jun. 20, 2018, (14 pages).
International Search Report and Written Opinion issued in connection with PCT/IB2018/000886 dated Dec. 4, 2018, (13 pages).
International Search Report and Written Opinion issued in connection with PCT/IB2018/000907 dated Nov. 26, 2018, (11 pages).
International Search Report issued in connection with PCT/US2009/054352 dated Mar. 12, 2010, (5 pages).
International Search Report issued in connection with PCT/US2008/077042 dated Mar. 13, 2009, (3 pages).
International Search Report issued in connection with PCT/US2009/031611 dated Jun. 3, 2009, (5 pages).
International Search Report issued in connection with PCT/US2009/061537 dated Jun. 7, 2010, (5 pages).
International Search Report issued in connection with PCT/US2009/066254 dated Feb. 24, 2010, (4 pages).
International Search Report issued in connection with PCT/US2013/033261 dated Jun. 14, 2013, (3 pages).
International Search Report issued in connection with PCT/US2013/033265 dated Jul. 9, 2013, (2 pages).
International Search Report issued in connection with PCT/US2013/033268 dated May 31, 2013, (2 pages).
Ioannis Ntzoufras "Bayesian Modeling Using Winbugs An Introduction", Department of Statistics, Athens University of Economics and Business, Wiley-Interscience, A John Wiley & Sons, Inc., Publication, Chapter 5, Jan. 1, 2007, pp. 155-220 (67 pages).
Koole, G. et al., "An Overview of Routing and Staffing Algorithms in Multi-Skill Customer Contact Centers," Manuscript, Mar. 6, 2006, (42 pages).
Koole, G., "Performance Analysis and Optimization in Customer Contact Centers," Proceedings of the Quantitative Evaluation of Systems, First International Conference, Sep. 27-30, 2004, (4 pages).
Nocedal, J. and Wright, S. J., "Numerical Optimization," Chapter 16 Quadratic Programming, 2006, pp. 448-496 (50 pages).
Ntzoufras, "Bayesian Modeling Using Winbugs". Wiley Interscience, Chapter 5, Normal Regression Models, Oct. 18, 2007, Redacted version, pp. 155-220 (67 pages).
Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).
Riedmiller, M. et al., "A Direct Adaptive Method for Faster Backpropagation Learning: The RPROP Algorithm," 1993 IEEE International Conference on Neural Networks, San Francisco, CA, Mar. 28-Apr. 1, 1993, 1:586-591 (8 pages).
Stanley et al., "Improving Call Center Operations Using Performance-Based Routing Strategies," California Journal of Operations Management, 6(1), 24-32, Feb. 2008; retrieved from http://userwww.sfsu.edu/saltzman/Publist.html (9 pages).
Written Opinion of the International Searching Authority issued in connection with PCT/US2009/054352 dated Mar. 12, 2010, (5 pages).
Written Opinion of the International Searching Authority issued in connection with PCT/US2008/077042 dated Mar. 13, 2009, (6 pages).
Written Opinion of the International Searching Authority issued in connection with PCT/US2009/031611 dated Jun. 3, 2009, (7 pages).
Written Opinion of the International Searching Authority issued in connection with PCT/US2009/061537 dated Jun. 7, 2010, (10 pages).
Written Opinion of the International Searching Authority issued in connection with PCT/US2009/066254 dated Feb. 24, 2010, (5 pages).

(56) References Cited

OTHER PUBLICATIONS

Written Opinion of the International Searching Authority issued in connection with PCT/US2013/033261 dated Jun. 14, 2013, (7 pages).
Written Opinion of the International Searching Authority issued in connection with PCT/US2013/033265 dated Jul. 9, 2013, (7 pages).
Written Opinion of the International Searching Authority issued in connection with PCT/US2013/033268 dated May 31, 2013, (7 pages).

* cited by examiner

TECHNIQUES FOR PAIRING IN A TASK ASSIGNMENT SYSTEM WITH AN EXTERNAL PAIRING SYSTEM

CROSS-REFERENCE TO RELATED APPLICATIONS

This patent application claims priority to U.S. Provisional Patent Application No. 62/970,529, filed Feb. 5, 2020, which is hereby incorporated by reference herein in its entirety.

FIELD OF THE DISCLOSURE

The present disclosure generally relates to task assignment systems and, more particularly, to techniques for pairing in a task assignment system with an external pairing system.

BACKGROUND OF THE DISCLOSURE

A typical pairing system algorithmically assigns tasks arriving at a task assignment system to agents available to handle those tasks. At times, the task assignment system may be in an "L1 state" and have agents available and waiting for assignment to tasks. At other times, the task assignment system may be in an "L2 state" and have tasks waiting in one or more queues for an agent to become available for assignment. At yet other times, the task assignment system may be in an "L3" state and have multiple agents available and multiple tasks waiting for assignment.

Some traditional pairing systems assign tasks to agents ordered based on time of arrival, and agents receive tasks ordered based on the time when those agents became available. This strategy may be referred to as a "first-in, first-out," "FIFO," or "round-robin" strategy. For example, in an L2 environment, when an agent becomes available, the task at the head of the queue would be selected for assignment to the agent.

Some task assignment systems prioritize some types of tasks ahead of other types of tasks. For example, some tasks may be high-priority tasks, while other tasks are low-priority tasks. Under a FIFO strategy, high-priority tasks will be assigned ahead of low-priority tasks.

Other traditional pairing systems may implement a performance-based routing (PBR) strategy for prioritizing higher-performing agents for task assignment. Under PBR, for example, the highest-performing agent among available agents receives the next available task.

"Behavioral Pairing" or "BP" strategies, for assigning tasks to agents, improve upon traditional pairing methods. BP targets balanced utilization of agents while improving overall task assignment system performance potentially beyond what FIFO or PBR methods achieve in practice.

Thus, it may be understood that there may be a need for techniques that enable a task assignment system to use high-performing pairing strategies (e.g., BP strategies) that improve upon traditional pairing strategies.

SUMMARY OF THE DISCLOSURE

Techniques for pairing in a task assignment system with an external pairing system are disclosed. In one particular embodiment, the techniques may be realized as a method for pairing in a task assignment system with an external pairing system comprising transmitting, by at least one computer processor communicatively coupled to and configured to operate in the task assignment system, to the external pairing system over an application programming interface, first information that identifies one or more tasks waiting for assignment and one or more agents available for assignment; transmitting, by the at least one computer processor, to the external pairing system over the application programming interface, a pairing request; determining, by the at least one computer processor, an initial timeout window to wait for the external pairing system to respond to the pairing request; receiving, by the at least one computer processor, from the external pairing system, at a first time within the initial timeout window, an extension request that includes an instruction to extend the initial timeout window; extending, by the at least one computer processor, the initial timeout window in response to the receiving the extension request; and receiving, by the at least one computer processor, from the external pairing system, at a second time within the extended timeout window, a pairing response that includes a selected pairing between the one or more tasks and the one or more agents.

In accordance with other aspects of this particular embodiment, the task assignment system is a contact center system.

In accordance with other aspects of this particular embodiment, the selected pairing may be selected according to a behavioral pairing strategy.

In accordance with other aspects of this particular embodiment, the initial timeout window may be extended by a predetermined duration of time.

In accordance with other aspects of this particular embodiment, the initial timeout window may be extended until a number of pairing choices exceeds a predetermined threshold.

In accordance with other aspects of this particular embodiment, the initial timeout window may be extended until the task assignment system transitions to an L3 environment.

In accordance with other aspects of this particular embodiment, the initial timeout window may be extended based on information included in the extension request.

In accordance with other aspects of this particular embodiment, the method may further comprise transmitting, by the at least one computer processor, to the external pairing system, during the extended timeout window, updated information identifying the one or more tasks and the one or more agents, the updated information identifying a greater number of tasks, a greater number of agents, or a greater number of tasks and a greater number of agents than the first information.

In accordance with other aspects of this particular embodiment, the method may further comprise routing a task among the one or more tasks to an agent among the one or more agents in accordance with the selected pairing.

In another particular embodiment, the techniques may be realized as a method for pairing in an external pairing system communicatively coupled to a task assignment system comprising receiving, by at least one computer processor communicatively coupled to and configured to operate in the external pairing system, from the task assignment system over an application programming interface, information that identifies one or more tasks waiting for assignment and one or more agents available for assignment; receiving, by the at least one computer processor, from the task assignment system, a pairing request that is associated with an initial timeout window; determining, by the at least one computer processor, to postpone selecting a pairing between the one or more tasks and the one or more agents; transmitting, by the at least one computer processor, to the task assignment system, at a first time within the initial timeout window, an extension request that includes an instruction to extend the initial timeout window; selecting, by the at least one computer processor, the pairing between the one or more tasks and the one or more agents; and transmitting, by the at least one computer processor, to the task assignment system, at a second time within the extended timeout window, a pairing response that identifies the selected pairing.

In accordance with other aspects of this particular embodiment, the task assignment system is a contact center system.

In accordance with other aspects of this particular embodiment, the selected pairing may be selected according to a behavioral pairing strategy.

In accordance with other aspects of this particular embodiment, the initial timeout window may be extended by a predetermined duration of time.

In accordance with other aspects of this particular embodiment, the initial timeout window may be extended until a number of pairing choices exceeds a predetermined threshold.

In accordance with other aspects of this particular embodiment, the initial timeout window may be extended until the task assignment system transitions to an L3 environment.

In accordance with other aspects of this particular embodiment, the initial timeout window may be extended based on information included in the extension request.

In accordance with other aspects of this particular embodiment, the method may further comprise receiving, by the at least one computer processor, from the task assignment system, during the extended timeout window, updated information identifying the one or more tasks and the one or more agents, the updated information identifying a greater number of tasks, a greater number of agents, or a greater number of tasks and a greater number of agents than the first information.

In accordance with other aspects of this particular embodiment, the method may further comprise routing a task among the one or more tasks to an agent among the one or more agents in accordance with the selected pairing.

In another particular embodiment, the techniques may be realized as a system for pairing in a task assignment system with an external pairing system or a system for pairing in an external pairing system comprising at least one computer processor communicatively coupled to and configured to operate in the task assignment system or the external pairing system, wherein the at least one computer processor is further configured to perform the steps in the above-described methods.

In another particular embodiment, the techniques may be realized as an article of manufacture for pairing in a task assignment system with an external pairing system or an article of manufacture for pairing in an external pairing system comprising a non-transitory processor readable medium and instructions stored on the medium, wherein the instructions are configured to be readable from the medium by at least one computer processor communicatively coupled to and configured to operate in the task assignment system or the external pairing system and thereby cause the at least one computer processor to operate so as to perform the steps in the above-described methods.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
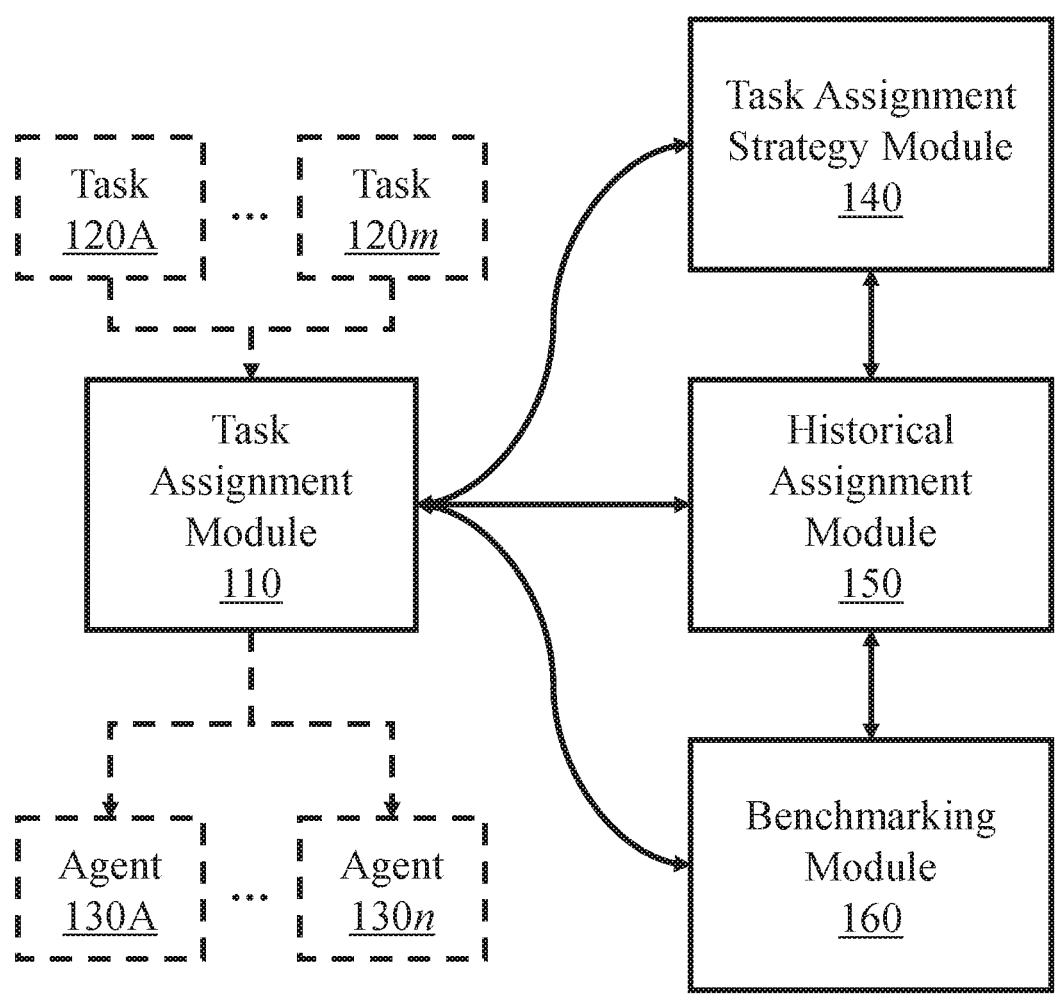
FIG. 1 shows a block diagram of a pairing system according to embodiments of the present disclosure.

A typical pairing system algorithmically assigns tasks arriving at a task assignment system to agents available to handle those tasks. At times, the task assignment system may be in an "L1 state" and have agents available and waiting for assignment to tasks. At other times, the task assignment system may be in an "L2 state" and have tasks waiting in one or more queues for an agent to become available for assignment. At yet other times, the task assignment system may be in an "L3" state and have multiple agents available and multiple tasks waiting for assignment. An example of a task assignment system is a contact center system that receives contacts (e.g., telephone calls, internet chat sessions, emails, etc.) to be assigned to agents.

Some traditional pairing systems assign tasks to agents ordered based on time of arrival, and agents receive tasks ordered based on the time when those agents became available. This strategy may be referred to as a "first-in, first-out," "FIFO," or "round-robin" strategy. For example, in an L2 environment, when an agent becomes available, the task at the head of the queue would be selected for assignment to the agent.

Other traditional pairing systems may implement a performance-based routing (PBR) strategy for prioritizing higher-performing agents for task assignment. Under PBR, for example, the highest-performing agent among available agents receives the next available task.

"Behavioral Pairing" or "BP" strategies, for assigning tasks to agents that improve upon traditional pairing methods. BP targets balanced utilization of agents while improving overall task assignment system performance potentially beyond what FIFO or PBR methods achieve in practice. This is a remarkable achievement inasmuch as BP acts on the same tasks and same agents as FIFO or PBR methods, approximately balancing the utilization of agents as FIFO provides, while improving overall task assignment system performance beyond what either FIFO or PBR provides in practice. BP improves performance by assigning agent and task pairs in a fashion that takes into consideration the assignment of potential subsequent agent and task pairs such that, when the benefits of multiple assignments are aggregated, they may exceed those of FIFO and PBR strategies.

Various BP strategies may be used, such as a diagonal model BP strategy or a network flow BP strategy. These task assignment strategies and others are described in detail for a contact center context in, e.g., U.S. Pat. Nos. 9,300,802; 9,781,269; 9,787,841; and 9,930,180; all of which are hereby incorporated by reference herein. BP strategies may be applied in an L1 environment (agent surplus, one task; select among multiple available/idle agents), an L2 environment (task surplus, one available/idle agent; select among multiple tasks in queue), and an L3 environment (multiple agents and multiple tasks; select among pairing permutations).

The performance of some pairing strategies may be improved when a task assignment system is in a particular environment or state. For example, the performance of a BP pairing strategy may improve in an L3 environment relative to an L1 or L2 environment, or in a state in which the number of pairing permutations exceeds a predetermined threshold. When a pairing system is integrated into a task assignment system, postponing the execution of a pairing strategy until the task assignment system is in the desired state may be straightforward given that the pairing system can readily cause the task assignment system to postpone execution of the pairing strategy and/or retrieve current state information from the task assignment system. As explained in detail below, embodiments of the present disclosure relate to techniques for pairing in a task assignment system with an external pairing system, where the ability of the pairing system to cause the task assignment system to postpone execution of the pairing strategy and/or retrieve current information about the state of task assignment system may be more limited.

The description herein describes network elements, computers, and/or components of a system and method for pairing strategies in a task assignment system that may include one or more modules. As used herein, the term "module" may be understood to refer to computing software, firmware, hardware, and/or various combinations thereof. Modules, however, are not to be interpreted as software which is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

FIG. 1 shows a block diagram of a pairing system 100 according to embodiments of the present disclosure. The pairing system 100 may be included in a task assignment system (e.g., contact center system) or incorporated in a component or module (e.g., a pairing module) of a task assignment system for helping to assign tasks (e.g., contacts) among various agents.

The pairing system 100 may include a task assignment module 110 that is configured to pair (e.g., match, assign, route) incoming tasks to available agents. In the example of FIG. 1, m tasks 120A-120$m$ are received over a given period, and n agents 130A-130$n$ are available during the given period. Each of the m tasks may be assigned to one of the n agents for servicing or other types of task processing. In the example of FIG. 1, m and n may be arbitrarily large finite integers greater than or equal to one. In a real-world task assignment system, such as a contact center system, there may be dozens, hundreds, etc. of agents logged into the contact center system to interact with contacts during a shift, and the contact center system may receive dozens, hundreds, thousands, etc. of contacts (e.g., telephone calls, internet chat sessions, emails, etc.) during the shift.

In some embodiments, a task assignment strategy module 140 may be communicatively coupled to and/or configured to operate in the pairing system 100. The task assignment strategy module 140 may implement one or more task assignment strategies (or "pairing strategies") for assigning individual tasks to individual agents (e.g., pairing contacts with contact center agents). A variety of different task assignment strategies may be devised and implemented by the task assignment strategy module 140. In some embodiments, a FIFO strategy may be implemented in which, for example, the longest-waiting agent receives the next available task (in L1 environments) or the longest-waiting task is assigned to the next available agent (in L2 environments). In other embodiments, a PBR strategy for prioritizing higher-performing agents for task assignment may be implemented. Under PBR, for example, the highest-performing agent among available agents receives the next available task. In yet other embodiments, a BP strategy may be used for optimally assigning tasks to agents using information about either tasks or agents, or both. Various BP strategies may be used, such as a diagonal model BP strategy or a network flow BP strategy. See U.S. Pat. Nos. 9,300,802; 9,781,269; 9,787,841; and 9,930,180.

In some embodiments, a historical assignment module 150 may be communicatively coupled to and/or configured to operate in the pairing system 100 via other modules such as the task assignment module 110 and/or the task assignment strategy module 140. The historical assignment module 150 may be responsible for various functions such as monitoring, storing, retrieving, and/or outputting information about task-agent assignments that have already been made. For example, the historical assignment module 150 may monitor the task assignment module 110 to collect information about task assignments in a given period. Each record of a historical task assignment may include information such as an agent identifier, a task or task type identifier, offer or offer set identifier, outcome information, or a pairing strategy identifier (i.e., an identifier indicating whether a task assignment was made using a BP strategy, or some other pairing strategy such as a FIFO or PBR pairing strategy).

In some embodiments and for some contexts, additional information may be stored. For example, in a call center context, the historical assignment module 150 may also store information about the time a call started, the time a call ended, the phone number dialed, and the caller's phone number. For another example, in a dispatch center (e.g., "truck roll") context, the historical assignment module 150 may also store information about the time a driver (i.e., field agent) departs from the dispatch center, the route recommended, the route taken, the estimated travel time, the actual travel time, the amount of time spent at the customer site handling the customer's task, etc.

In some embodiments, the historical assignment module 150 may generate a pairing model or a similar computer processor-generated model based on a set of historical assignments for a period of time (e.g., the past week, the past month, the past year, etc.), which may be used by the task assignment strategy module 140 to make task assignment recommendations or instructions to the task assignment module 110.

In some embodiments, a benchmarking module 160 may be communicatively coupled to and/or configured to operate in the pairing system 100 via other modules such as the task assignment module 110 and/or the historical assignment module 150. The benchmarking module 160 may benchmark the relative performance of two or more pairing strategies (e.g., FIFO, PBR, BP, etc.) using historical assignment information, which may be received from, for example, the historical assignment module 150. In some embodiments, the benchmarking module 160 may perform other functions, such as establishing a benchmarking schedule for cycling among various pairing strategies, tracking cohorts (e.g., base and measurement groups of historical assignments), etc. Benchmarking is described in detail for the contact center context in, e.g., U.S. Pat. No. 9,712,676, which is hereby incorporated by reference herein.

In some embodiments, the benchmarking module 160 may output or otherwise report or use the relative performance measurements. The relative performance measurements may be used to assess the quality of a pairing strategy to determine, for example, whether a different pairing strategy (or a different pairing model) should be used, or to measure the overall performance (or performance gain) that was achieved within the task assignment system while it was optimized or otherwise configured to use one pairing strategy instead of another.

Figure 2:
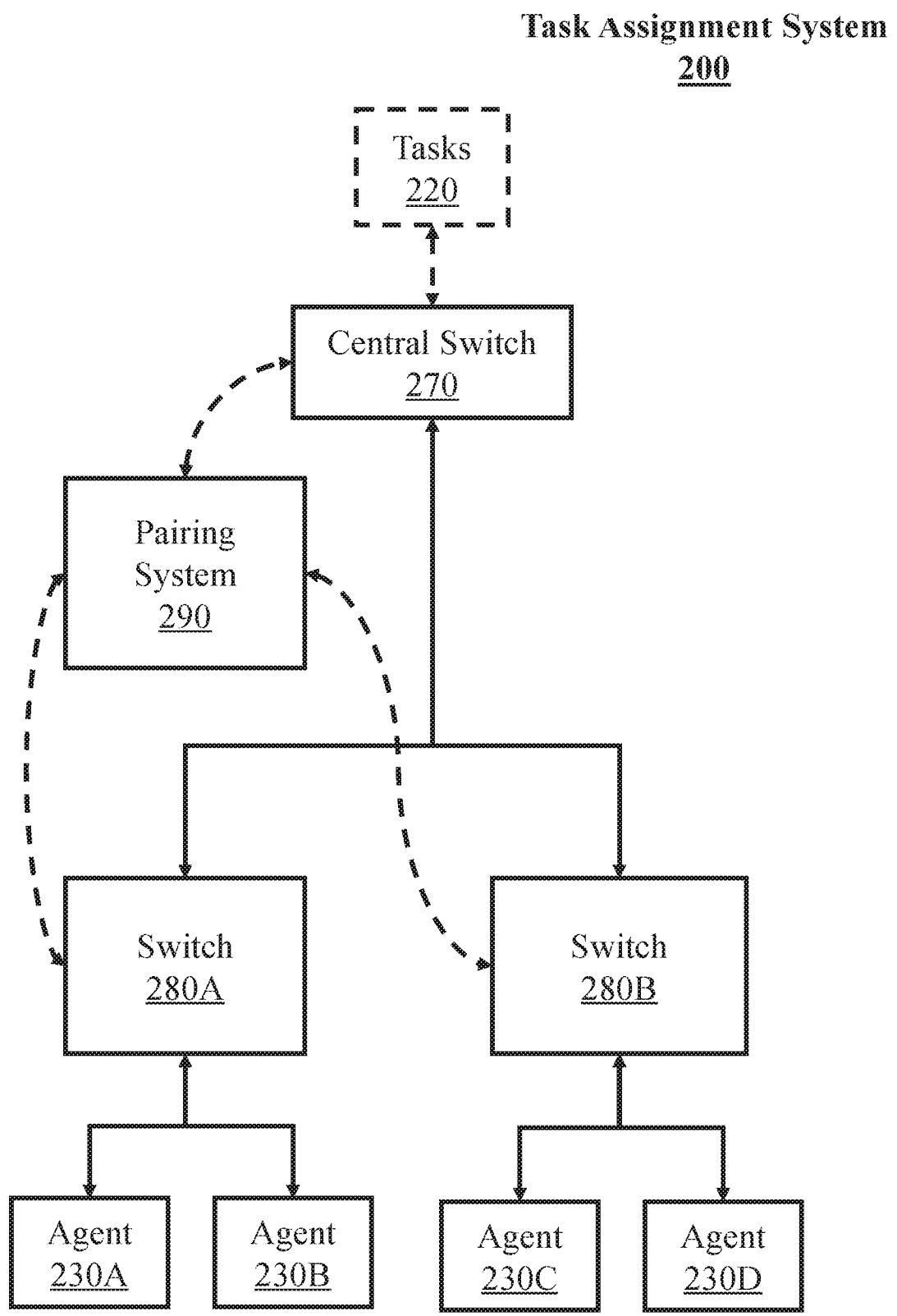
FIG. 2 shows a block diagram of a task assignment system according to embodiments of the present disclosure.

FIG. 2 shows a block diagram of a task assignment system 200 according to embodiments of the present disclosure. The task assignment system 200 may include a central switch 270. The central switch 270 may receive incoming tasks 220 (e.g., telephone calls, internet chat sessions, emails, etc.) or support outbound connections to contacts via a dialer, a telecommunications network, or other modules (not shown). The central switch 270 may include routing hardware and software for helping to route tasks among one or more queues (or subcenters), or to one or more Private Branch Exchange ("PBX") or Automatic Call Distribution (ACD) routing components or other queuing or switching components within the task assignment system 200. The central switch 270 may not be necessary if there is only one queue (or subcenter), or if there is only one PBX or ACD routing component in the task assignment system 200.

If more than one queue (or subcenter) is part of the task assignment system 200, each queue may include at least one switch (e.g., switches 280A and 280B). The switches 280A and 280B may be communicatively coupled to the central switch 270. Each switch for each queue may be communicatively coupled to a plurality (or "pool") of agents. Each switch may support a certain number of agents (or "seats") to be logged in at one time. At any given time, a logged-in agent may be available and waiting to be connected to a task, or the logged-in agent may be unavailable for any of a number of reasons, such as being connected to another task, performing certain post-call functions such as logging information about the call, or taking a break. In the example of FIG. 2, the central switch 270 routes tasks to one of two queues via switch 280A and switch 280B, respectively. Each of the switches 280A and 280B are shown with two agents each. Agents 230A and 230B may be logged into switch 280A, and agents 230C and 230D may be logged into switch 280B.

The task assignment system 200 may also be communicatively coupled to an integrated pairing system 290. The pairing system 290 may be native to (or built in) the task assignment system 200 (i.e., "first-party") or may be a service provided by, for example, a third-party vendor. In the example of FIG. 2, the pairing system 290 may be communicatively coupled to one or more switches in the switch system of the task assignment system 200, such as central switch 270, switch 280A, and switch 280B. In some embodiments, switches of the task assignment system 200 may be communicatively coupled to multiple pairing systems. In some embodiments, the pairing system 290 may be embedded within a component of the task assignment system 200 (e.g., embedded in or otherwise integrated with a switch). An example of the pairing system 290 is the pairing system 100, which is described above.

The pairing system 290 may receive information from a switch (e.g., switch 280A) about agents logged into the switch (e.g., agents 230A and 230B) and about incoming tasks 220 via another switch (e.g., central switch 270) or, in some embodiments, from a network (e.g., the Internet or a telecommunications network) (not shown). The pairing system 290 may process this information to determine which tasks should be paired (e.g., matched, assigned, distributed, routed) with which agents.

For example, in an L1 state, multiple agents may be available and waiting for connection to a task, and a task arrives at the task assignment system 200 via a network or the central switch 270. As explained above, without the pairing system 290, a switch will typically automatically distribute the new task to whichever available agent has been waiting the longest amount of time for an agent under a FIFO strategy, or whichever available agent has been determined to be the highest-performing agent under a PBR strategy. With the pairing system 290, contacts and agents may be given scores (e.g., percentiles or percentile ranges/bandwidths) according to a pairing model or other artificial intelligence data model, so that a task may be matched, paired, or otherwise connected to a preferred agent.

In an L2 state, multiple tasks are available and waiting for connection to an agent, and an agent becomes available. These tasks may be queued in a switch such as a PBX or ACD device. Without the pairing system 290, a switch will typically connect the newly available agent to whichever task has been waiting on hold in the queue for the longest amount of time as in a FIFO strategy or a PBR strategy when agent choice is not available. In some task assignment systems, priority queuing may also be incorporated, as previously explained. With the pairing system 290 in this L2 scenario, as in the L1 state described above, tasks and agents may be given percentiles (or percentile ranges/bandwidths, etc.) according to, for example, a model, such as an artificial intelligence model, so that an agent becoming available may be matched, paired, or otherwise connected to a preferred task.

In the task assignment system 200, the pairing system 290 may switch between pairing strategies and benchmark the relative performance of the task assignment system under each pairing strategy (e.g., by using a benchmarking module such as benchmarking module 160 of pairing system 100). The benchmarking results may help to determine which pairing strategy or combination of pairing strategies to use to optimize or improve the overall performance of the task assignment system 200.

The performance of a pairing strategy or combination of pairing strategies may be improved when the task assignment system 200 is in a particular state. For example, the performance of a BP pairing strategy may improve in an L3 environment relative to an L1 or L2 environment, or in a state in which the number of pairing permutations exceeds a predetermined threshold. Given that the pairing system 290 is integrated with—or "internal" to—the task assignment system 200, postponing the execution of a pairing strategy until the task assignment system 200 is in the desired state may be straightforward given that the pairing system 290 can readily cause the task assignment system 200 to postpone execution of the pairing strategy and/or retrieve current state information from the task assignment system 200. However, in a task assignment system with an external pairing system, postponing execution of a pairing strategy may not be as straightforward, as will be described next.

Figure 3:
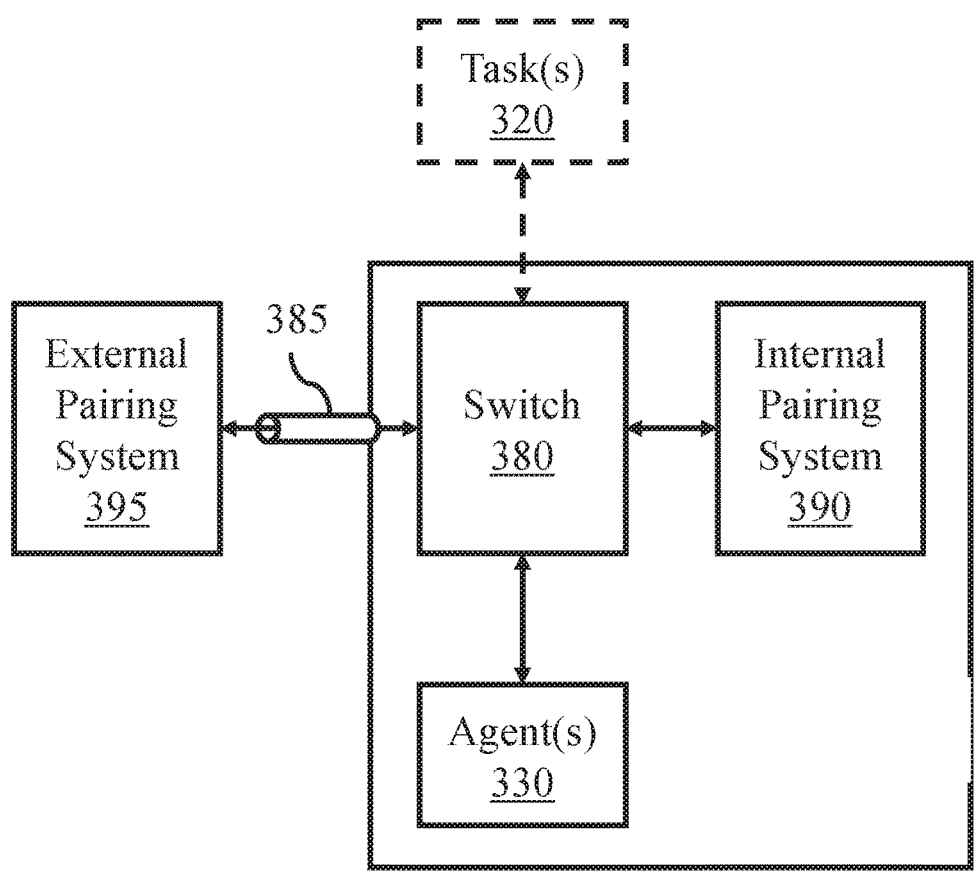
FIG. 3 shows a block diagram of a task assignment system with an external pairing system according to embodiments of the present disclosure.

FIG. 3 shows a block diagram of a task assignment system 300 with an external pairing system 395 according to embodiments of the present disclosure. In the task assignment system 300, a switch 380 may route a plurality of tasks 320 to a plurality of agents 330. The switch 380 may include routing hardware and software, or to one or more PBX or ACD routing components or other queuing or switching components for helping to route the plurality of tasks 320 among the plurality of agents 330.

In the task assignment system 300, an internal pairing system 390 may be communicatively coupled to the switch 380. The internal pairing system 390 may be native to (or built in) the task assignment system 300 (i.e., "first-party") or may be provided by a third-party vendor. Typically, the internal pairing system 390 may implement traditional pairing strategies (e.g., FIFO or PBR) or some other pairing strategy that may be proprietary to the task assignment system 300. However, the internal pairing system 390 may also be in the form of the pairing system 100. The internal pairing system 390 may receive or otherwise retrieve information from the switch 380 about the agents 330 logged into the switch 380 and about the incoming tasks 320.

In the task assignment system 300, the external pairing system 395 may be communicatively coupled to the switch 380 via an interface 385. The interface 385 may isolate the task assignment system 300 from the external pairing system 395 (e.g., for security purposes), and control information exchanged between the two systems. An example of the interface 385 may be a public or a private proprietary application programming interface (API) provided over a network (e.g., the Internet or a telecommunications network) (not shown).

Relative to the internal pairing system 390, the external pairing system 395 may have access to less information associated with switch 380, e.g., a limited subset of information that is selected and shared by the switch 380. Similarly, relative to the internal pairing system 390, the external pairing system 395 may have less control over the operation of switch 380. Such information and/or control is generally sufficient for the external pairing system 395 to determine the task-agent pairing and convey the determined task-agent pairing to switch 380. The external pairing system 395 may be provided by a third-party vendor and may be in the form of the pairing system 100 described above. The external pairing system 395 may provide a pairing strategy (e.g., BP) that improves the performance of the task assignment system 300 when compared to the pairing strategy (or strategies) of the internal pairing system 390. The external pairing system 395 may also provide the same or a similar pairing strategy as that of the internal pairing system 390.

The task assignment system 300 may operate under a shared control, in which the switch 380 may send route requests to either or both of the internal pairing system 390 and the external pairing system 395 to determine which task is to be routed to which agent. The shared control may be desirable, for example, when the internal pairing system 390 employs a traditional or proprietary pairing strategy (e.g., FIFO or PBR) that may not be provided by the external pairing system 395, while the external pairing system 395 is used to provide a higher-performing pairing strategy (e.g., BP).

When the external pairing system 395 includes the same or a similar pairing strategy as that of the internal pairing system 390, the task assignment system 300 may operate under full control such that the switch 380 sends all route requests to the external pairing system 395. In other words, the external pairing system 395 has full control on determining every task-agent pairing. Under the full control, at times, the external pairing system 395 may simulate/mimic the pairing strategy of the internal pairing system 390 (e.g., FIFO or PBR) and, at other times, employ a different pairing strategy (e.g., BP), and send its pairing recommendation to the switch 380 over the interface 385. The switch 380 may then assign the tasks 320 to agents 330 based on the pairing recommendation.

In some embodiments, the performance of the external pairing system 395 may be determined at least in part by a number of pairing choices available to the external pairing system 395 at a given point in time. For example, in an L1 environment (agent surplus, one task; select among multiple available/idle agents), the number of pairing choices corresponds to the number of agents that are available. In an L2 environment (task surplus, one available/idle agent; select among multiple tasks in queue), the number of pairing choices corresponds to the number of tasks available. In an L3 environment (multiple agents and multiple tasks; select among pairing permutations), the number of pairing choices corresponds to the number of permutations between the number of agents and tasks that are available.

The effect of having a small number of pairing choices may be to reduce the performance gains that can be derived from using a higher performing pairing strategy (e.g., BP) relative to a traditional pairing strategy (e.g., FIFO or PBR). For example, when one agent and one task are available, there is a single pairing choice, so any pairing strategy will select the same pairing. On the other hand, when many agents and/or tasks are available, this yields a large number of pairing choices. The strategy for selecting among this large number of pairing choices can have a significant impact on performance. Accordingly, the difference between a high performing pairing strategy and a traditional pairing strategy generally increases with the number of pairing choices. The relationship between the number of available pairing choices and performance is described in detail in, e.g., U.S. Pat. No. 10,257,354, which is incorporated by reference herein.

Consequently, to improve the performance of a high performing pairing strategy, it may be desirable to delay or otherwise postpone the selection of a pairing between an agent and a task when the number of pairing choices is too small to achieve the desired level of performance (e.g., when the number of pairing choices is below a predetermined threshold, or when the task assignment system 300 is in the L1 or L2 state). Postponing the selection may provide time for new tasks to be added to the queue or more agents to become available, thereby increasing the number of pairing choices. In some embodiments, delaying the selection may allow the task assignment system 300 to transition from an L1 or L2 state (where the number of pairing choices increases linearly with the number of tasks or agents) to an L3 state (where number of pairing choices increases super-linearly with the number of tasks or agents).

When a pairing strategy is implemented by internal pairing system 390, postponing the selection can be implemented by directly monitoring the state of the task assignment system 300 and waiting until the number of pairing choices exceeds a threshold. See, e.g., U.S. Pat. No. 10,257,354. However, for pairing strategies implemented by the external pairing system 395, adding a period of delay may involve an exchange of communications over an API between external pairing system 395 and task assignment system 300, as further described below.

Figure 4:
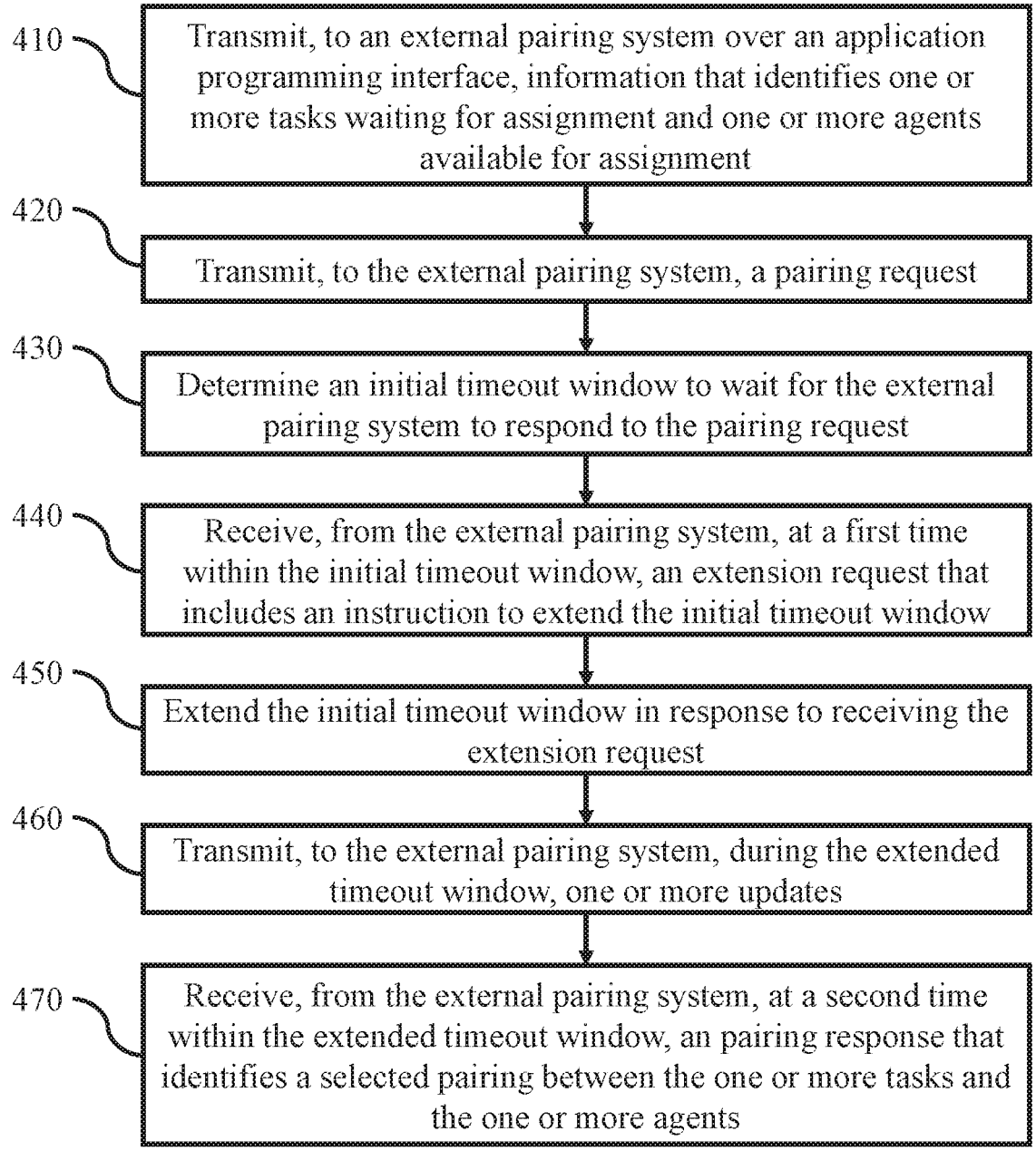
FIG. 4 shows a flow diagram of a pairing method for a task assignment system with an external pairing system according to embodiments of the present disclosure.

FIG. 4 shows a flow diagram of a pairing method 400 for a task assignment system (e.g., task assignment system 300) with an external pairing system (e.g., external pairing system 395) according to embodiments of the present disclosure.

The pairing method 400 may begin at block 410. At block 410, information that identifies one or more tasks waiting for assignment and one or more agents available for assignment may be transmitted to the external pairing system over an API. In some embodiments, the information may be transmitted in response to an event, such as a new task being added to a queue of the task assignment system, or a new agent becoming available to receive a task. In the context of a contact center, the one or more tasks may correspond to one or more incoming contacts (e.g., customer calls, emails, chat messages, or the like). In some embodiments, the block 410 may be repeated at various times during the pairing method 400 to reflect updated information about the one or more tasks and the one or more agents (e.g., block 410 may be repeated each time a new agent or task becomes available, when a transition between L1, L2, and/or L3 environments occurs, an event associated with the task assignment system occurs, or the like).

At block 420, a pairing request (e.g., a routing request) may be transmitted to the external pairing system over the API. The pairing request may include information that causes the external pairing system to execute a pairing strategy to determine which of the one or more tasks is to be routed to which of the one or more agents. In some embodiments, the pairing request may be transmitted along with (e.g., in the same message as) the identification of the one or more tasks and the one or more agents at block 410.

At block 430, an initial timeout window to wait for the external pairing system to respond to the pairing request may be determined. When the initial timeout window lapses without receiving a response from the external pairing system, the pairing method 400 may determine that an error or fault occurred. For example, it may be determined that the pairing request or response encountered an error in transmission, the external pairing system may be down or inaccessible, the format of the pairing request or response may be invalid or incompatible with the API, or the like. In general, the duration of the initial timeout window may be selected to provide enough time for the external pairing system to respond under normal conditions (e.g., accounting for routine transmission delays and latency) without triggering an error. The duration can be fixed or flexible (e.g., adaptively updated based on current network conditions or the like). When it is determined that an error or fault has occurred, one or more remedial actions may be taken. Illustrative examples of remedial actions can include, but are not limited to, resending the pairing request (e.g., returning to block 420), notifying an operator of the task assignment system and/or the external pairing system, re-routing the pairing request from the external pairing system to an internal pairing system (e.g., internal pairing system 390), or the like.

At block 440, an extension request may be received, from the external pairing system over the API, at a first time within the initial timeout window. The extension request may include an instruction to extend the initial timeout window. In some embodiments, the extension request may be received when the external pairing system determines that the state of the task assignment system is suboptimal for implementing a pairing strategy. For example, the extension request may be received when the external pairing system determines that the number of pairing choices (e.g., the number of permutations of pairings between the one or more tasks and the one or more agents) is below a predetermined threshold. The predetermined threshold can be set to a value where the number of pairing choices is too low for the pairing strategy of the external pairing system to achieve optimal or near-optimal performance. In some embodiments, the extension request may be received when the external pairing system determines that the environment of the task assignment system is not an L3 environment (e.g., the environment is an L1 or an L2 environment). The extension request may include any information suitable to convey the instruction to extend the initial timeout window. For example, the extension request can include a control flag or other indicator. In some embodiments, the extension request may include information that indicates an amount of time by which to extend the duration of the initial timeout window. The extension request can also include other criteria for extending the timeout window (e.g., an indication to extend the timeout window until the number of available agents, tasks, and/or pairing choices reaches a predetermined value, or until the environment develops into an L3 environment).

At block 450, the initial timeout window may be extended in response to receiving the extension request. Providing an extended timeout window to wait for a response from the external pairing system may provide time for new tasks to be added to the queue and/or for more agents to become available. The duration of the extended timeout window may be fixed or flexible (e.g., determined adaptively based on network conditions). In some embodiments, the duration of the extended timeout window may be determined based on information included in the extension request, such as a requested duration of the time extension.

At block 460, one or more updates may be transmitted, to the external pairing system over the API, during the extended timeout window. The one or more updates may include updated information (e.g., updated relative to the information transmitted at block 410) that identifies the one or more tasks waiting for assignment and one or more agents available for assignment. Transmitting the updates may be triggered by various events, such as a new task being added to the queue and/or more agents becoming available. Accordingly, the updated information may identify more tasks and/or agents than the original information transmitted at block 410. In some embodiments, the updates may be transmitted at predetermined intervals, e.g., periodically. Each time an update is transmitted, the timeout window may be optionally extended by an additional duration to provide additional time for the external pairing system account for the updated information in its response.

At block 470, a pairing response that identifies a selected pairing between the one or more tasks and the one or more agents may be received, from the external pairing system over the API, at a second time within the extended timeout window. The pairing response generally provides information sufficient for a determination to be made as to which task is to be routed to which agent. In some embodiments, the pairing response may be received in response to the external pairing system determining that, during the extended timeout window, the number of pairing choices reached or exceeded a predetermined threshold. In some embodiments, the pairing response may be received in response to the external pairing system determining that, during the extended timeout window, the environment transitioned from an L1 or L2 environment to an L3 environment. Once the selected pairing is received, a corresponding task may be assigned to a corresponding agent in accordance with the selected pairing.

The foregoing description of the pairing method 400 is non-limiting, and various of its processes may be added, removed, modified, substituted, or rearranged without departing from the broader spirit and scope of the disclosure. In some embodiments, the timeout window can be extended multiple times, e.g., a plurality of extension requests may be received. For example, the timeout window may be re-extended when, at or near the end of a currently extended timeout window, the external pairing system determines that the number of pairing choices is still below the predetermined threshold or the environment has not yet developed into an L3 environment. The maximum number of times that the window can be extended, or the maximum total duration of the extended timeout window, may be limited. For example, a policy may be in place between the task assignment system and the external pairing system that specifies the maximum number of times the timeout window can be extended or the maximum total duration of the extended timeout window. These limits may also be specified in a configuration file.

During the extended timeout window, the external pairing system may generate multiple pairing selections, e.g., the pairing method 400 may receive a plurality of pairing responses that identify a selected pairing between the one or more tasks and the one or more agents. In some embodiments, an updated pairing response may be received each time the pairing method 400 transmits an update to the external pairing system. In this manner, the selected pairing at a given point in time during the extended timeout window may be based on up-to-date information about available tasks and agents. The pairing method 400 may postpone implementing the selected pairing until the end of the extended timeout window, such that the selected pairing as of the end of the extended timeout window (accounting for updates received during the timeout window) serves as the final selected pairing that is used to route a corresponding task to a corresponding agent.

Figure 5:
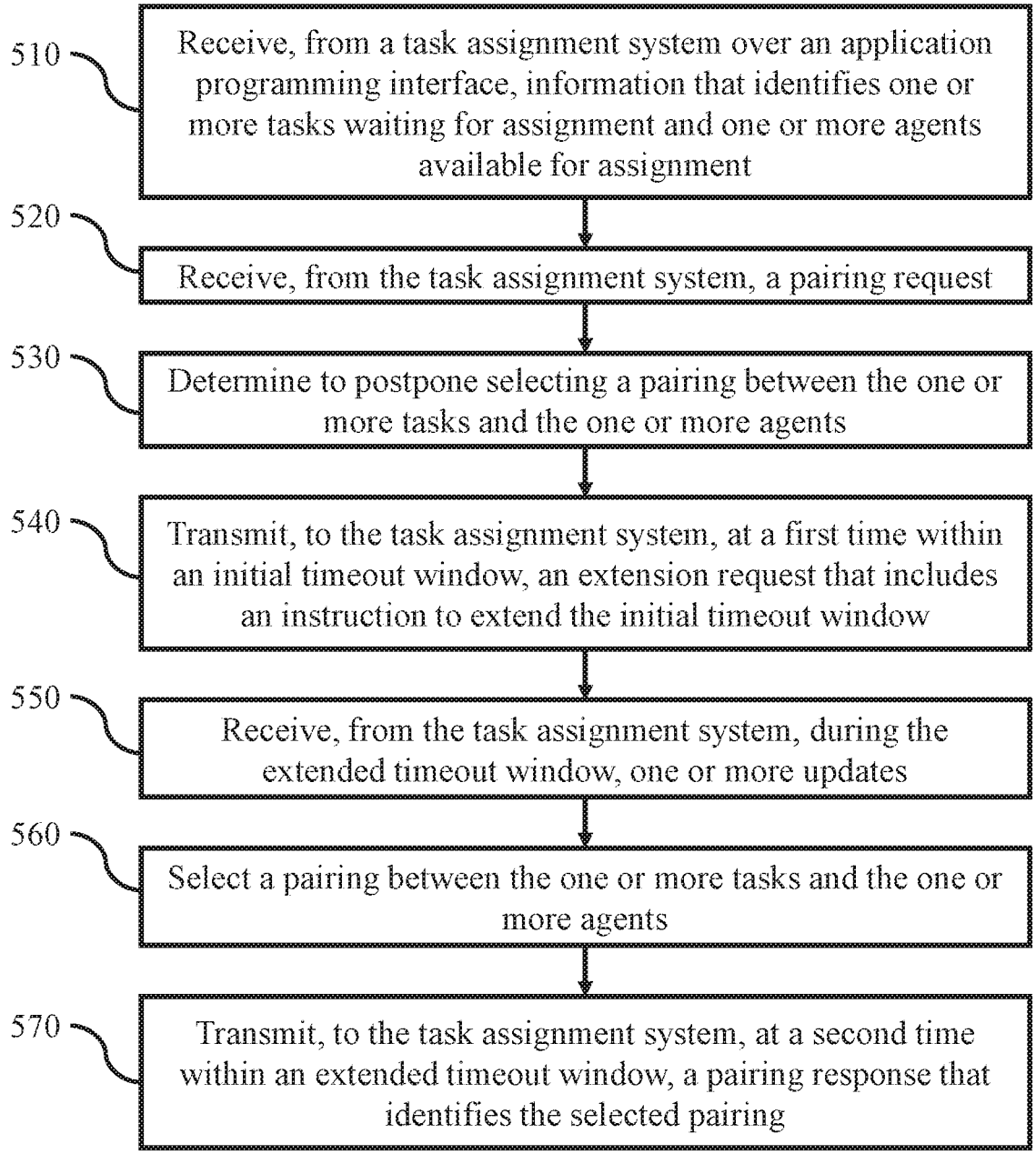
FIG. 5 shows a flow diagram of a pairing method for an external pairing system communicatively coupled to a task assignment system according to embodiments of the present disclosure.

FIG. 5 shows a flow diagram of a pairing method 500 for an external pairing system (e.g., external pairing system 395) communicatively coupled to a task assignment system (e.g., task assignment system 300) according to embodiments of the present disclosure.

The pairing method 500 may begin at block 510. At block 510, information that identifies one or more tasks waiting for assignment and one or more agents available for assignment may be received from the task assignment system over an API. In some embodiments, the information may be received in response to an event detected at the task assignment system, such as a new task being added to a queue of the task assignment system, or a new agent becoming available to receive a task. In the context of a contact center, the one or more tasks may correspond to one or more incoming contacts (e.g., customer calls, emails, chat messages, or the like). In some embodiments, the block 510 may be repeated at various times during the pairing method 500 to reflect updated information about the one or more tasks and the one or more agents (e.g., block 510 may be repeated each time a new agent or task becomes available, when a transition between L1, L2, and/or L3 environments occurs, or the like).

At block 520, a pairing request (e.g., a routing request) may be received from the task assignment system over the API. In response to receiving the pairing request, a pairing strategy (e.g., a BP strategy) may be executed to determine which of the one or more tasks is to be routed to which of the one or more agents. In some embodiments, the pairing request may be received along with (e.g., in the same message as) the identification of the one or more tasks and the one or more agents at block 510. In some embodiments consistent with FIG. 4, the pairing request may be associated with an initial timeout window implemented by the task assignment system. When the initial timeout window lapses before a response to the pairing request is provided, the task assignment system may determine that an error or fault occurred. For example, the task assignment system may determine that the pairing request or response encountered an error in transmission, that the external pairing system is down or inaccessible, the format of the pairing request or response may be invalid or incompatible with the API, or the like. In general, the duration of the initial timeout window may be selected to provide a sufficient amount of time to respond under normal conditions (e.g., accounting for routine transmission delays and latency) without triggering an error. The duration can be fixed or flexible (e.g., adaptively updated based on current network conditions or the like).

At block 530, a determination may be made to postpone selecting a pairing between the one or more tasks and the one or more agents. In some embodiments, the determination to postpone the selection may be made in response to determining that the current state of the task assignment system is suboptimal for implementing the pairing strategy. For example, the selection may be postponed when the number of pairing choices (e.g., the number of permutations of pairings between the one or more tasks and the one or more agents) is below a predetermined threshold. The predetermined threshold may be set to a value at which the number of pairing choices is too low for the pairing strategy of the external pairing system to achieve optimal or near-optimal performance. In some embodiments, the determination to postpone the selection may be made in response to determining that the environment is not an L3 environment (e.g., the environment is an L1 or an L2 environment). By postponing the selection, additional time may be provided for the number of pairing choices to increase and/or for the environment to develop into an L3 environment. In some embodiments, determining to postpone the selection may include determining a duration of time to postpone the selection, the duration being fixed or flexible.

At block 540, an extension request that includes an instruction to extend the initial timeout window may be transmitted, to the task assignment system over the API, at a first time within the initial timeout window. The extension request can generally include any information suitable to convey the instruction to extend the initial timeout window.

For example, the extension request can include a control flag or other indicator. In some embodiments, the extension request may include information that indicates an amount of time by which to extend the duration of the initial timeout window. The extension request may include other criteria for extending the timeout window (e.g., an indication to extend the timeout window until the number of available agents, tasks, and/or pairing choices reaches a predetermined threshold, or until the environment develops into an L3 environment). The extension request may cause the task assignment system to extend the initial timeout window. In turn, extending the timeout window may provide time for new tasks to be added to the queue and/or for more agents to become available. The duration of the extended timeout window may be fixed or flexible (e.g., determined adaptively based on network conditions). In some embodiments, the duration of the extended timeout window may be determined based on information included in the extension request.

At block 550, one or more updates may be received, from the task assignment system over the API, during the extended timeout window. For example, the one or more updates may include updated information (e.g., updated relative to the information received at block 510) that identifies the one or more tasks waiting for assignment and one or more agents available for assignment. Receiving the updates may be triggered by various events associated with the task assignment system, such as a new task being added to the queue and/or more agents becoming available. Accordingly, the updated information may identify more tasks and/or agents than the original information transmitted at block 510. The updates may also be received at predetermined intervals, e.g., periodically.

At block 560, a pairing between the one or more tasks and the one or more agents may be selected. In some embodiments, the pairing may be selected in response to determining that, during the extended timeout window, the number of pairing choices reached or exceeded a predetermined threshold at which the performance of the pairing strategy is sufficiently high to justify selecting a pairing. In some embodiments, the pairing may be selected in response to determining that, during the extended timeout window, the environment transitioned from an L1 or L2 environment to an L3 environment. In some embodiments, the pairing may be selected using a pairing strategy implemented by the external pairing system, such as the BP strategy. Executing the pairing strategy can include executing one or more artificial intelligence models.

At block 570, a pairing response that identifies the selected pairing may be transmitted, to the task assignment system over the API, at a second time within the extended timeout window. The pairing response generally provides information sufficient for the task assignment system to determine which task is to be routed to which agent. Transmitting the pairing response may cause the task assignment system to assign a corresponding task to a corresponding agent in accordance with the selected pairing.

The foregoing description of the pairing method 500 is non-limiting, and various of its processes may be added, removed, modified, substituted, or rearranged without departing from the broader spirit and scope of the disclosure. In some embodiments, the pairing method 500 can request multiple extensions of the timeout window, e.g., a plurality of extension requests may be transmitted. For example, the timeout window may be re-extended when, at or near the end of a currently extended timeout window, it is determined that the number of pairing choices is still below the predetermined threshold. The maximum number of times that the window can be extended, or the maximum duration to which the timeout window can be extended, may be limited. For example, a policy may be in place between the pairing method 500 and the task assignment system that specifies the maximum number of times the timeout window can be extended or the maximum duration of the timeout window. Moreover, the maximum number of times the timeout window can be extended or the maximum duration of the timeout window may be specified in a configuration file.

During the extended timeout window, multiple pairing selections may be generated and transmitted, e.g., a plurality of pairing responses that identify a selected pairing between the one or more tasks and the one or more agents may be transmitted. In some embodiments, an updated pairing response may be transmitted each time an update from the task assignment system is received. In this manner, the selected pairing at a given point in time during the extended timeout window may be based on up-to-date information about available tasks and agents. The task assignment system may postpone implementing the selected pairing until the end of the extended timeout window, such that the selected pairing as of the end of the timeout window (accounting for updates received during the timeout window) serves as the final selected pairing that is used to route a corresponding task to a corresponding agent.

At this point it should be noted that task assignment in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with task assignment in accordance with the present disclosure as described above. Alternatively, one or more processors operating in accordance with instructions may implement the functions associated with task assignment in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

The invention claimed is:

1. A method for pairing in a task assignment system with an external pairing system, the method comprising:
   transmitting, by at least one computer processor communicatively coupled to and configured to operate in the task assignment system, to the external pairing system over an application programming interface, first information that identifies one or more tasks waiting for assignment in a switch of the task assignment system and one or more agents available for assignment in the switch of the task assignment system, wherein the external pairing system is configured to execute at least one pairing strategy based at least in part on at least one artificial intelligence model that increases overall performance of the task assignment system relative to an internal pairing system of the task assignment system, wherein the application programming interface at least partially isolates the external pairing system from other portions of the task assignment system and controls information exchanged between the external pairing system and the other portions of the task assignment system;

transmitting, by the at least one computer processor, to the external pairing system over the application programming interface, a pairing request;

determining, by the at least one computer processor, an initial timeout window to wait for the external pairing system to respond to the pairing request;

receiving, by the at least one computer processor, from the external pairing system, at a first time within the initial timeout window, an extension request that includes an instruction to extend the initial timeout window;

extending, by the at least one computer processor, the initial timeout window in response to the receiving the extension request;

receiving, by the at least one computer processor, from the external pairing system, at a second time within the extended timeout window, a pairing response that includes a selected pairing between the one or more tasks and the one or more agents, wherein the selected pairing is a result of executing the at least one pairing strategy; and causing, by the at least one computer processor, the one or more tasks to be routed to the one or more agents in the switch of the task assignment system based at least in part upon the selected pairing;

wherein the external pairing system has access to less information associated with the switch of the task assignment system and less control over operations of the switch relative to the internal pairing system of the task assignment system.

2. The method of claim 1, wherein the task assignment system is a contact center system.

3. The method of claim 1, wherein the selected pairing is selected according to a behavioral pairing strategy.

4. The method of claim 1, wherein the initial timeout window is extended by a predetermined duration of time.

5. The method of claim 1, wherein the initial timeout window is extended until a number of pairing choices exceeds a predetermined threshold.

6. The method of claim 1, wherein the initial timeout window is extended until the task assignment system transitions to an L3 environment.

7. The method of claim 1, wherein the initial timeout window is extended based on information included in the extension request.

8. The method of claim 1, further comprising transmitting, by the at least one computer processor, to the external pairing system, during the extended timeout window, updated information identifying the one or more tasks and the one or more agents, the updated information identifying a greater number of tasks, a greater number of agents, or a greater number of tasks and a greater number of agents than the first information.

9. The method of claim 1, further comprising routing a task among the one or more tasks to an agent among the one or more agents in accordance with the selected pairing.

10. A system for pairing in a task assignment system with an external pairing system comprising:

at least one computer processor communicatively coupled to and configured to operate in the task assignment system, wherein the at least one computer processor is further configured to:

transmit, to the external pairing system over an application programming interface, first information that identifies one or more tasks waiting for assignment in a switch of the task assignment system and one or more agents available for assignment in the switch of the task assignment system, wherein the external pairing system is configured to execute at least one pairing strategy based at least in part on at least one artificial intelligence model that increases overall performance of the task assignment system relative to an internal pairing system of the task assignment system, wherein the application programming interface at least partially isolates the external pairing system from other portions of the task assignment system and controls information exchanged between the external pairing system and the other portions of the task assignment system;

transmit, to the external pairing system over the application programming interface, a pairing request;

determine an initial timeout window to wait for the external pairing system to respond to the pairing request;

receive, from the external pairing system, at a first time within the initial timeout window, an extension request that includes an instruction to extend the initial timeout window;

extend the initial timeout window in response to the receiving the extension request;

receive, from the external pairing system, at a second time within the extended timeout window, a pairing response that includes a selected pairing between the one or more tasks and the one or more agents, wherein the selected pairing is a result of executing the at least one pairing strategy; and cause the one or more tasks to be routed to the one or more agents in the switch of the task assignment system based at least in part upon the selected pairing;

wherein the external pairing system has access to less information associated with the switch of the task assignment system and less control over operations of the switch relative to the internal pairing system of the task assignment system.

11. The system of claim 10, wherein the task assignment system is a contact center system.

12. The system of claim 10, wherein the selected pairing is selected according to a behavioral pairing strategy.

13. The system of claim 10, wherein the initial timeout window is extended by a predetermined duration of time.

14. The system of claim 10, wherein the initial timeout window is extended until a number of pairing choices exceeds a predetermined threshold.

15. The system of claim 10, wherein the initial timeout window is extended until the task assignment system transitions to an L3 environment.

16. The system of claim 10, wherein the initial timeout window is extended based on information included in the extension request.

17. The system of claim 10, wherein the at least one computer processor is further configured to transmit, to the external pairing system, during the extended timeout window, updated information identifying the one or more tasks and the one or more agents, the updated information identifying a greater number of tasks, a greater number of agents, or a greater number of tasks and a greater number of agents than the first information.

18. The system of claim 10, wherein the at least one computer processor is further configured to route a task among the one or more tasks to an agent among the one or more agents in accordance with the selected pairing.

19. An article of manufacture for pairing in a task assignment system with an external pairing system comprising:
a non-transitory processor readable medium; and
instructions stored on the medium;
wherein the instructions are configured to be readable from the medium by at least one computer processor communicatively coupled to and configured to operate in the task assignment system and thereby cause the at least one computer processor to operate so as to:
transmit, to the external pairing system over an application programming interface, first information that identifies one or more tasks waiting for assignment in a switch of the task assignment system and one or more agents available for assignment in the switch of the task assignment system, wherein the external pairing system is configured to execute at least one pairing strategy based at least in part on at least one artificial intelligence model that increases overall performance of the task assignment system relative to an internal pairing system of the task assignment system, wherein the application programming interface at least partially isolates the external pairing system from other portions of the task assignment system and controls information exchanged between the external pairing system and the other portions of the task assignment system;
transmit, to the external pairing system over the application programming interface, a pairing request;
determine an initial timeout window to wait for the external pairing system to respond to the pairing request;
receive, from the external pairing system, at a first time within the initial timeout window, an extension request that includes an instruction to extend the initial timeout window;
extend the initial timeout window in response to the receiving the extension request;
receive, from the external pairing system, at a second time within the extended timeout window, a pairing response that includes a selected pairing between the one or more tasks and the one or more agents, wherein the selected pairing is a result of executing the at least one pairing strategy; and
cause the one or more tasks to be routed to the one or more agents in the switch of the task assignment system based at least in part upon the selected pairing;
wherein the external pairing system has access to less information associated with the switch of the task assignment system and less control over operations of the switch relative to the internal pairing system of the task assignment system.

20. The article of manufacture of claim 19, wherein the task assignment system is a contact center system.

21. The article of manufacture of claim 19, wherein the selected pairing is selected according to a behavioral pairing strategy.

22. The article of manufacture of claim 19, wherein the initial timeout window is extended by a predetermined duration of time.

23. The article of manufacture of claim 19, wherein the initial timeout window is extended until a number of pairing choices exceeds a predetermined threshold.

24. The article of manufacture of claim 19, wherein the initial timeout window is extended until the task assignment system transitions to an L3 environment.

25. The article of manufacture of claim 19, wherein the initial timeout window is extended based on information included in the extension request.

26. The article of manufacture of claim 19, wherein the instructions are further configured to cause the at least one computer processor to operate so as to transmit, to the external pairing system, during the extended timeout window, updated information identifying the one or more tasks and the one or more agents, the updated information identifying a greater number of tasks, a greater number of agents, or a greater number of tasks and a greater number of agents than the first information.

27. The article of manufacture of claim 19, wherein the instructions are further configured to cause the at least one computer processor to operate so as to route a task among the one or more tasks to an agent among the one or more agents in accordance with the selected pairing.

28. A method for pairing in an external pairing system communicatively coupled to a task assignment system, the method comprising:
receiving, by at least one computer processor communicatively coupled to and configured to operate in the external pairing system, from the task assignment system over an application programming interface, information that identifies one or more tasks waiting for assignment in a switch of the task assignment system and one or more agents available for assignment in the switch of the task assignment system, wherein the external pairing system is configured to execute at least one pairing strategy based at least in part on at least one artificial intelligence model that increases overall performance of the task assignment system relative to an internal pairing system of the task assignment system, wherein the application programming interface at least partially isolates the external pairing system from other portions of the task assignment system and controls information exchanged between the external pairing system and the other portions of the task assignment system;
receiving, by the at least one computer processor, from the task assignment system, a pairing request that is associated with an initial timeout window;
determining, by the at least one computer processor, to postpone selecting a pairing between the one or more tasks and the one or more agents;
transmitting, by the at least one computer processor, to the task assignment system, at a first time within the initial timeout window, an extension request that includes an instruction to extend the initial timeout window;
selecting, by the at least one computer processor, the pairing between the one or more tasks and the one or more agents by executing the at least one pairing strategy;
transmitting, by the at least one computer processor, to the task assignment system, at a second time within the extended timeout window, a pairing response that identifies the selected pairing; and causing, by the at least one computer processor, the one or more tasks to be routed to the one or more agents in the switch of the task assignment system based at least in part upon the selected pairing;

wherein the external pairing system has access to less information associated with the switch of the task assignment system and less control over operations of the switch relative to the internal pairing system of the task assignment system.

29. The method of claim 28, wherein the task assignment system is a contact center system.

30. The method of claim 28, wherein the selected pairing is selected according to a behavioral pairing strategy.

31. The method of claim 28, wherein the initial timeout window is extended by a predetermined duration of time.

32. The method of claim 28, wherein the initial timeout window is extended until a number of pairing choices exceeds a predetermined threshold.

33. The method of claim 28, wherein the initial timeout window is extended until the task assignment system transitions to an L3 environment.

34. The method of claim 28, wherein the initial timeout window is extended based on information included in the extension request.

35. The method of claim 28, further comprising receiving, by the at least one computer processor, from the task assignment system, during the extended timeout window, updated information identifying the one or more tasks and the one or more agents, the updated information identifying a greater number of tasks, a greater number of agents, or a greater number of tasks and a greater number of agents than the first information.

36. The method of claim 28, further comprising routing a task among the one or more tasks to an agent among the one or more agents in accordance with the selected pairing.

37. A system for pairing in an external pairing system communicatively coupled to a task assignment system comprising:

at least one computer processor communicatively coupled to and configured to operate in the external pairing system, wherein the at least one computer processor is further configured to:

receive, from the task assignment system over an application programming interface, information that identifies one or more tasks waiting for assignment in a switch of the task assignment system and one or more agents available for assignment in the switch of the task assignment system, wherein the external pairing system is configured to execute at least one pairing strategy based at least in part on at least one artificial intelligence model that increases overall performance of the task assignment system relative to an internal pairing system of the task assignment system, wherein the application programming interface at least partially isolates the external pairing system from other portions of the task assignment system and controls information exchanged between the external pairing system and the other portions of the task assignment system;

receive, from the task assignment system, a pairing request that is associated with an initial timeout window;

determine to postpone selecting a pairing between the one or more tasks and the one or more agents;

transmit, to the task assignment system, at a first time within the initial timeout window, an extension request that includes an instruction to extend the initial timeout window;

select the pairing between the one or more tasks and the one or more agents by executing the at least one pairing strategy;

transmit, to the task assignment system, at a second time within the extended timeout window, a pairing response that identifies the selected pairing; and cause the one or more tasks to be routed to the one or more agents in the switch of the task assignment system based at least in part upon the selected pairing;

wherein the external pairing system has access to less information associated with the switch of the task assignment system and less control over operations of the switch relative to the internal pairing system of the task assignment system.

38. The system of claim 37, wherein the task assignment system is a contact center system.

39. The system of claim 37, wherein the selected pairing is selected according to a behavioral pairing strategy.

40. The system of claim 37, wherein the initial timeout window is extended by a predetermined duration of time.

41. The system of claim 37, wherein the initial timeout window is extended until a number of pairing choices exceeds a predetermined threshold.

42. The system of claim 37, wherein the initial timeout window is extended until the task assignment system transitions to an L3 environment.

43. The system of claim 37, wherein the initial timeout window is extended based on information included in the extension request.

44. The system of claim 37, wherein the at least one computer processor is further configured to receive, from the task assignment system, during the extended timeout window, updated information identifying the one or more tasks and the one or more agents, the updated information identifying a greater number of tasks, a greater number of agents, or a greater number of tasks and a greater number of agents than the first information.

45. The system of claim 37, wherein the at least one computer processor is further configured to route a task among the one or more tasks to an agent among the one or more agents in accordance with the selected pairing.

46. An article of manufacture for pairing in an external pairing system communicatively coupled to a task assignment system comprising:

a non-transitory processor readable medium; and instructions stored on the medium;

wherein the instructions are configured to be readable from the medium by at least one computer processor communicatively coupled to and configured to operate in the external pairing system and thereby cause the at least one computer processor to operate so as to:

receive, from the task assignment system over an application programming interface, information that identifies one or more tasks waiting for assignment in a switch of the task assignment system and one or more agents available for assignment in the switch of the task assignment system, wherein the external pairing system is configured to execute at least one pairing strategy based at least in part on at least one artificial intelligence model that increases overall performance of the task assignment system relative to an internal pairing system of the task assignment system, wherein the application programming interface at least partially isolates the external pairing system from other portions of the task assignment system and controls information exchanged between the external pairing system and the other portions of the task assignment system;
receive, from the task assignment system, a pairing request that is associated with an initial timeout window;
determine to postpone selecting a pairing between the one or more tasks and the one or more agents;
transmit, to the task assignment system, at a first time within the initial timeout window, an extension request that includes an instruction to extend the initial timeout window;
select the pairing between the one or more tasks and the one or more agents by executing the at least one pairing strategy;
transmit, to the task assignment system, at a second time within the extended timeout window, a pairing response that identifies the selected pairing; and
cause the one or more tasks to be routed to the one or more agents in the switch of the task assignment system based at least in part upon the selected pairing;
wherein the external pairing system has access to less information associated with the switch of the task assignment system and less control over operations of the switch relative to the internal pairing system of the task assignment system.

47. The article of manufacture of claim 46, wherein the task assignment system is a contact center system.

48. The article of manufacture of claim 46, wherein the selected pairing is selected according to a behavioral pairing strategy.

49. The article of manufacture of claim 46, wherein the initial timeout window is extended by a predetermined duration of time.

50. The article of manufacture of claim 46, wherein the initial timeout window is extended until a number of pairing choices exceeds a predetermined threshold.

51. The article of manufacture of claim 46, wherein the initial timeout window is extended until the task assignment system transitions to an L3 environment.

52. The article of manufacture of claim 46, wherein the initial timeout window is extended based on information included in the extension request.

53. The article of manufacture of claim 46, wherein the instructions are further configured to cause the at least one computer processor to operate so as to receive, from the task assignment system, during the extended timeout window, updated information identifying the one or more tasks and the one or more agents, the updated information identifying a greater number of tasks, a greater number of agents, or a greater number of tasks and a greater number of agents than the first information.

54. The article of manufacture of claim 46, wherein the instructions are further configured to cause the at least one computer processor to operate so as to route a task among the one or more tasks to an agent among the one or more agents in accordance with the selected pairing.

* * * * *